Feb. 23, 1960     W. C. HUEBENER ET AL     2,926,024

EXERCISING ATTACHMENT FOR PROPELLING A BICYCLE

Filed Nov. 1, 1957

INVENTORS.
WILLIAM C. HUEBENER.
LAWRENCE F. BLANK.

BY *Maurice W. Green*

ATTORNEY.

United States Patent Office 2,926,024
Patented Feb. 23, 1960

2,926,024

EXERCISING ATTACHMENT FOR PROPELLING A BICYCLE

William C. Huebener, Cincinnati, Ohio, and Lawrence F. Blank, Covington, Ky.

Application November 1, 1957, Serial No. 693,850

1 Claim. (Cl. 280—248)

This invention relates to a propelling attachment for bicycles and more particularly to such an attachment adaptable for providing exercise for chest, arm, and shoulder muscles while riding a bicycle.

The invention is particularly adaptable where exercise of a mild form, reaching arms, chest, and shoulder muscles as well as leg muscles is important. Some medical authorities are of the opinion that emphasis on controlled exercise of the arm and chest muscles is advantageous in certain heart conditions as well of course as the recognition that exercise reaching a major portion of the muscles of the body is advantageous to general good health. Bicycling as a form of exercise as distiguished from a mere means of transportation is recognized by medical authorities.

It is a primary object of this invention to improve the bicycle as an exercise apparatus without changing its conventional appearance in any great degree.

It is a further object to provide an attachment for a bicycle which will afford exercise for the arms and attendant muscles at the will of the rider but without changing to any material extent the maneuverability and steering characteristics of the bicycle.

It is another object to provide a propelling mechanism actuated from the handle bars of the bicycle for up-and-down movement of both handle bars simultaneously, thus enabling steering control of the bicycle to be maintained.

It is a further object to provide a position of the handle bars coinciding with a disconnected state of the drive mechanism where up-and-down propelling movement is not effective and where the bicycle is driven in the same manner as without the propelling attachment.

The above and other objects of the invention will appear more fully from the following more detailed description and by reference to the accompanying drawings forming a part hereof and wherein.

Figure 1:
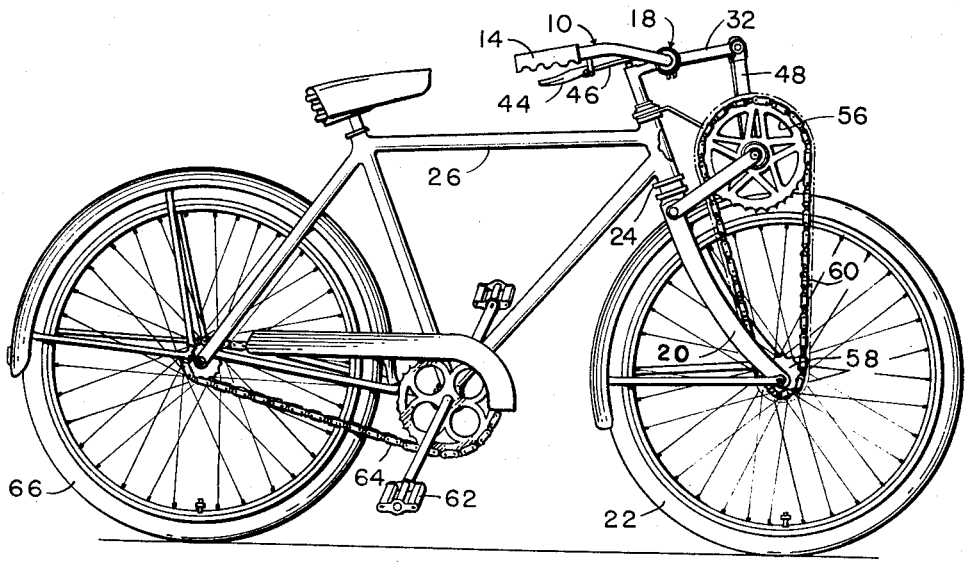
Figure 1 is a side view of a bicycle with the front wheel arm propelling attachment assembled thereto.

Referring to the drawings, handle bar unit 10, of conventional shape with rearwardly extending hand grips 12 and 14, has a horizontal central portion 16 journaled in a bearing 18 formed at the top of the usual type of bicycle front fork 20 which carries a front wheel 22 at the lower end thereof and is mounted on a bearing 24 of the frame 26 of the bicycle for steering. The bearing 18 mounting the handle bar 10 allows the central portion 16 to swing about an axis which is parallel to the axis of the wheel 22. The handle bar 10 with the hand grips 12 and 14 are thus mounted for up-and-down swinging movement, both hand grips 12 and 14 moving up and down together. However, the downward movement is limited by a stop 28 carried on the central portion 16 of the handle bar which contacts an abutment 30 secured to the outside of the bearing 18. A lever 32 having a bearing forming collar 34 is mounted free to rotate on the horizontal portion 16 of the handle bar to one side of the bearing 18. A clutch collar 36 is mounted adjacent collar 34 and is free to slide but not to rotate relative to the horizontal handle bar portion 16. Clutch jaws 38 on collar 36 mate with jaws 40 on collar 34. A spring 42 normally holds the jaws toward engagement. A hand lever 44 under the hand grip 12 provides for manual movement of clutch collar 36 out of engagement through cable connector 46. Such movement is against the action of spring 42.

The lever 32 extends forwardly from the horizontal portion 16 of the handle bar and when held in place by the clutch collar 36 will be moved in an arc by up-and-down movement of the handle bar 10. A downwardly extending link 48 connects lever 32 with a crank 50 mounted on the end of a horizontal jack shaft 52 mounted in bearing housing 54. The opposite end of jack shaft 52 carries a drive sprocket 56 which drives wheel sprocket 58 mounted to rotate front wheel 22 through a chain 60.

Figure 5:
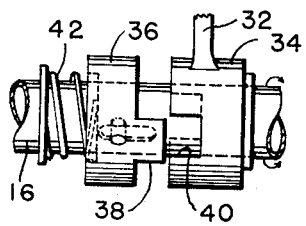
Figure 5 is a top view of the central portion of the handle bar showing the clutch disconnected and illustrating the fact that with the handle bar in down position the clutch will not re-engage.

As shown by Figure 5 the positioning of the clutch collar 36 on handle bar portion 16 is such that the arc of swing of lever 32 as required by the radius of crank 50 is such that stop 28 does not contact abutment 30 during such movement as long as clutch jaws 38 are in engagement with jaws 40. However, when hand lever 44 under hand grip 12 is actuated to disconnect the clutch jaws the handle bar 10 may be pushed downward so that stop 28 contacts abutment 30 (see Figure 4). It is shown in Figure 5 that the relative width of the mating clutch jaws 38 and 40 are such that with the handle bar down against the stop the movement of collar 34 as the wheel 22 and connecting drive continue to rotate, there will not be an opportunity for the jaws 38 and 40 to mesh as with the arc of movement of lever 32 and bearing collar 34 the jaws 38 and 40 will never come into meshing alignment. However, if connection of the handle bar 10 to the front wheel for drive is desired the handle bar may be lifted upwardly and the spring 42 will then cause engagement to occur.

Figures 2, 3, 4:
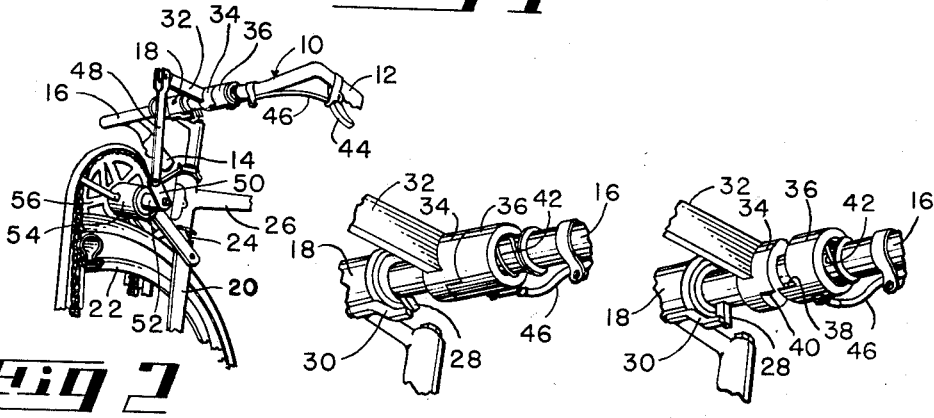
Figure 2 is a perspective view showing the part of the propelling attachment and the controls therefor.
Figure 3 is a perspective view of the central horizontal portion of the handle bar with the lever and clutch mechanism in position for propelling operation by up-and-down movement of the handle bars.
Figure 4 is a view similar to Figure 3 but with the clutch parts out of engagement to de-activate the mechanism and leave the bicycle in normal foot propelled condition.
Figure 6:
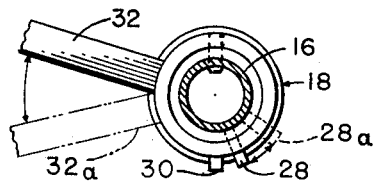
Figure 6 is a view showing the arc of movement of the lever actuating the propelling attachment.

Figure 6 shows the arc of movement of the lever 32 when the clutch 36 (see Figure 3) is in engagement and the position of the stop 28 is shown in solid line for the upper position of the lever 32 which corresponds to the solid line showing of such lever. However, when the handle bars are moved upwardly to drive the crank 50 through the link 48 the lever 32 moves downwardly as shown in Figure 6 to the dotted line position 32a and likewise the stop 28a moves counterclockwise to the position shown dotted at 28a and as the handle bar is "pumped" up and down, the arc of movement of the lever 32 and the stop 28 continue to oscillate in the arc as shown, and it is noted on Figure 6 that this arc of movement with the clutch engagement as shown in Figure 3, that the stop 28 never contacts the abutment 30 as long as the clutch 36 is engaged for driving the front wheel by the up-and-down action of the handle bar. However, if it is desired to disconnect the front wheel drive and the exercising attachment, the operator by actuation of the hand lever 44 disconnects the clutch as previously mentioned and pushes downwardly on the handle bar, and in this condition the stop 28 will move to a position against the abutment 30. Such a condition is shown in Figure 4 and in such condition as previously mentioned it will be impossible to engage the clutch.

In operation the rider of the bicycle may if desired begin this operation in the conventional manner by foot pedals 62 and chain drive 64 to rear wheel 66. With the bicycle in foot pedal drive along with some downward push expected on the handle bars the handle bar unit 10 will be down against the abutment 30 (see Figure 4) and the drive to the front wheel 22 will be disengaged by disengagement of clutch 36 as previously described. However, on the desire of the rider he may lift upward on both handle bar grips 12 and 14 and this will result in engagement of clutch 36 and continued up-and-down movement of the handle bar by the rider's arms will drive the front wheel through the mechanism previously described.

It has been found important that the handle bar grips move together rather than alternately as such movement in unison makes for better control in steering and maneuvering of the bicycle. Also the immediate return to normal non-driving relationship when desired by simply pushing downward and actuating hand lever 44 is also a satisfactory arrangement. In this way the rider may at will gain the advantage of this arm and upper body exercising feature which is the primary purpose of the attachment.

It is also to be pointed out that with the structure shown the control and conventional appearance of the bicycle are not materially changed and with this attachment the rider is provided with an exercising apparatus which he can use at will during a ride.

Although the invention has been described by reference to a specific mechanism found practical in actual operation, it is contemplated that various changes and modifications may be made by substitution of equivalent mechanisms within the skill of the art without departing from the fundamental principle and within the scope of the following claim:

What we claim is:

In an exercising bicycle attachment of the character described, a drive mechanism for the front wheel of the bicycle comprising a handle bar mounted for oscillation on an axis substantially parallel with the axis of rotation of said front wheel, an abutment limiting downward travel of said handle bar in its oscillating movement, connections to drive said wheel by oscillating movement of said handle bar, clutch parts relatively positioned to connect said connections in driving oscillating relationship in both directions in an arc of movement wholly above contact position of said handle bar with said abutment, a clutch lever on said handle bar operable to disconnect said clutch parts and allow said handle bar to be moved downwardly against said stop beyond said arc of oscillating movement, relatively positioned members of said clutch parts so formed as to cause relative positioning of said clutch parts on said movement of said handle bar against said abutment, so that said connections remain out of driving relationship and said wheel may rotate independent of said handle bar and thereby to allow said handle bar to remain against said stop for normal steering action without oscillation.

References Cited in the file of this patent

UNITED STATES PATENTS

| | | |
|---|---|---|
| 498,394 | Huennekens | May 30, 1893 |
| 628,426 | Woodruff | July 4, 1899 |
| 2,160,034 | Schwinn | May 30, 1939 |
| 2,512,755 | Vosper | June 27, 1950 |

FOREIGN PATENTS

| | | |
|---|---|---|
| 17,905 | Great Britain | of 1898 |
| 426,044 | Great Britain | Mar. 26, 1935 |